United States Patent
Hotta et al.

(10) Patent No.: US 6,861,039 B1
(45) Date of Patent: Mar. 1, 2005

(54) METHOD FOR PURIFICATION OF PHOSPHORIC ACID HIGH PURITY POLYPHOSPHORIC ACID

(75) Inventors: Kiyoshi Hotta, Fukui (JP); Fuyuhiko Kubota, Shiga (JP)

(73) Assignee: Toyo Boeski Kabushiki Kaisha, Osaka (JP)

( * ) Notice: Subject to any disclaimer, the term of this patent is extended or adjusted under 35 U.S.C. 154(b) by 0 days.

(21) Appl. No.: 09/869,379

(22) PCT Filed: Dec. 24, 1999

(86) PCT No.: PCT/JP99/07312

§ 371 (c)(1),
(2), (4) Date: Oct. 16, 2001

(87) PCT Pub. No.: WO00/40507

PCT Pub. Date: Jul. 13, 2000

(30) Foreign Application Priority Data

Dec. 28, 1998 (JP) .......................... 10/373696
Aug. 17, 1999 (JP) .......................... 11/230628

(51) Int. Cl.$^7$ ..................... C01B 25/234; C01B 25/237
(52) U.S. Cl. ..................... 423/321.1; 423/316; 423/317
(58) Field of Search ............. 423/317, 321.1, 423/316

(56) References Cited

U.S. PATENT DOCUMENTS

| | | | | |
|---|---|---|---|---|
| 2,287,683 A | * | 6/1942 | Hurka ........................ | 423/47 |
| 3,342,549 A | * | 9/1967 | Sakomura et al. ....... | 423/321.1 |
| 3,723,606 A | * | 3/1973 | Klingelhoefer et al. .. | 423/321.1 |
| 3,991,164 A | * | 11/1976 | Scheibitz et al. ........... | 423/316 |
| 4,044,108 A | | 8/1977 | Kikuchi et al. | |
| 4,046,687 A | * | 9/1977 | Schulze .................... | 210/674 |
| 4,053,564 A | * | 10/1977 | Bradford et al. ......... | 423/321.2 |
| 4,082,836 A | * | 4/1978 | Ore ......................... | 423/321.2 |
| 4,083,934 A | * | 4/1978 | Jernigan et al. ............ | 423/317 |
| 4,215,098 A | * | 7/1980 | Lowe et al. ............... | 423/305 |
| 4,296,082 A | * | 10/1981 | Lowe et al. ............... | 423/305 |
| 4,309,394 A | * | 1/1982 | Hudson .................... | 423/317 |
| 4,399,114 A | * | 8/1983 | Maurer et al. ........... | 423/321.1 |
| 4,466,948 A | * | 8/1984 | Schimmel et al. ....... | 423/321.2 |
| 4,492,680 A | | 1/1985 | Frankenfeld et al. | |
| 4,629,614 A | * | 12/1986 | Schimmel et al. ....... | 423/321.1 |
| 4,639,359 A | * | 1/1987 | Michalski et al. ....... | 423/321.1 |
| 4,692,228 A | * | 9/1987 | Twardowski ............. | 205/563 |
| 4,777,028 A | * | 10/1988 | Schrodter ................ | 423/321.1 |
| 4,780,294 A | * | 10/1988 | Schimmel et al. ....... | 423/321.1 |
| 4,824,650 A | * | 4/1989 | Segrist .................... | 423/321.1 |
| 5,246,681 A | | 9/1993 | Calicchio | |

FOREIGN PATENT DOCUMENTS

| | | |
|---|---|---|
| DE | 33 27 394 | 2/1985 |
| GB | 1601474 | * 10/1981 |
| JP | B-53-128595 | 10/1981 |
| JP | 60-166208 | 8/1985 |
| JP | A-06-048712 | 2/1994 |
| JP | A-06-100307 | 4/1994 |

* cited by examiner

Primary Examiner—Wayne A. Langel
Assistant Examiner—William G. Wright, Sr.
(74) Attorney, Agent, or Firm—Morrison & Foerster, LLP

(57) ABSTRACT

The present invention provides a purification method of phosphoric acid, which includes bringing phosphoric acid containing arsenic into contact with hydrogen halide, thereby to remove the arsenic from the phosphoric acid, and a purification method of phosphoric acid, which includes bringing phosphoric acid containing arsenic into contact with hydrogen halide in the presence of a compound capable of generating hydrogen halide under acidic conditions. According to the method for purifying phosphoric acid of the present invention, a completely new method for removing arsenic in phosphoric acid is provided, which does not require a filtration or deaeration step or shows a great amount of residual sodium, unlike a sulfide coagulation method. This method is applicable to high concentration phosphoric acid, particularly polyphosphoric acid, and can be practiced at a low cost. In addition, a conventionally nonexistent high purity polyphosphoric acid having an arsenic (As) content of not more than 1 ppm and low contents of heavy metal, silica, sodium and the like can be provided.

5 Claims, No Drawings

US 6,861,039 B1

METHOD FOR PURIFICATION OF PHOSPHORIC ACID HIGH PURITY POLYPHOSPHORIC ACID

TECHNICAL FIELD

The present invention relates to a method for purifying phosphoric acid, which can efficiently reduce the content of harmful heavy metal, particularly that of arsenic, and to high purity polyphosphoric acid obtained thereby, which is expected to be applicable to a broader range of use in the fields of food, medicaments and electronic materials.

BACKGROUND ART

As a production method of phosphoric acid, there have been known a wet method and a dry method, and phosphoric acid is industrially produced by one of these methods. In the wet method, phosphorous ore is dissolved in sulfuric acid, a gypsum component is filtered off to produce dilute phosphoric acid having a low concentration, and the dilute phosphoric acid is concentrated to a desired level to give phosphoric acid. In the dry method, phosphorous ore is reduced in an electric furnace to give yellow phosphorus, which is burnt to give phosphoric anhydride, which is then hydrated to give phosphoric acid. In general, the wet method does not require reduction or combustion and is considered to be advantageous from the aspect of production cost. The dry method is considered to be advantageous from the aspect of quality, because the production via phosphoric anhydride reduces contamination of impurities derived from phosphorous ore. In any production method, however, the obtained phosphoric acid contains arsenic derived from phosphorous ore or phosphoric anhydride, which is harmful for human body, in generally about several dozen ppm, and the arsenic is removed by a sulfide coagulation method according to the use of the phosphoric acid. A conventional method for removing arsenic is applicable only to phosphoric acid having a $P_2O_5$ concentration of up to about 60%.

High concentration phosphoric acid, particularly polyphosphoric acid ($P_2O_5$ concentration of not less than 72.4%), is also produced by the aforementioned wet method or dry method, like phosphoric acid. Polyphosphoric acid produced by the dry method generally shows lower heavy metal, silica and sodium contents because the production goes through phosphoric anhydride. However, it contains arsenic derived from phosphoric anhydride in about 5–100 ppm, because a conventional method for removing arsenic cannot be applied to high concentration phosphoric acid. Polyphosphoric acid produced by the wet method shows a low arsenic content of less than 1 ppm because a conventional method for removing arsenic can be applied before concentration. On the other hand, it characteristically shows high contents of heavy metal, silica and sodium derived from phosphorous ore. High concentration phosphoric acid, particularly polyphosphoric acid, which characteristically shows a low arsenic content and low contents of heavy metal, silica and sodium, has not been obtained.

When phosphoric acid having a $P_2O_5$ concentration of up to about 60%, which is obtained by a dry method, is subjected to a dearsenic treatment by a conventional sulfide coagulation method and the like and concentrated, polyphosphoric acid having low contents of arsenic, heavy metal, silica and sodium is presumably obtained. However, such production method has not been put to practical use. This is because equipment for burning and hydrating yellow phosphorus and for highly concentrating the resulting phosphoric acid is required, which is extremely disadvantageous from the economical point of view, due to high facility costs and high operation costs.

The arsenic contained in phosphoric acid and polyphosphoric acid is particularly problematic for a use that requires high purity, in the fields of food, medicaments, electronic materials and the like. Given the high attention to the environmental problems in recent years, moreover, phosphoric acid and polyphosphoric acid having a low arsenic content are desired as industrial phosphoric acid to be used for metal surface treatment, dye processing and the like. Therefore, a method for removing arsenic, which affords efficient operation at lower costs, is demanded.

Known methods for removing arsenic from phosphoric acid include (1) sulfide coagulation method, (2) solvent extraction method and (3) ion exchange method. Of these, the sulfide coagulation method is most popular because the required steps and equipment are rather simple and this method is operable at a low cost. This method includes bringing phosphoric acid into contact with hydrogen sulfide, or sodium sulfide, sodium hydrosulfide and the like, which produce hydrogen sulfide upon dissolution in phosphoric acid, to allow precipitation of arsenic as arsenic sulfide, which is followed by separation for removal. In contrast, the solvent extraction method and ion exchange method are less popular because of the complicated steps and complicated equipment, as well as higher costs.

However, the sulfide coagulation method, too, requires filtration equipment, such as vacuum filter, press filter, centrifuge separator and the like. The precipitated arsenic sulfide tends to become a gel, which makes it difficult to separate and remove arsenic from phosphoric acid. For facilitated separation, a method (Japanese Unexamined Publication No. 6-48712) comprising passage through an activated carbon tower, and a method (Japanese Unexamined Publication No. 6-100307) comprising addition of a chelating resin are used. These methods are unpreferable because the facility and treatment costs become higher.

When hydrogen sulfide remains in phosphoric acid, moreover, corrosion of phosphoric acid is enhanced, thus necessitating deaeration of excess hydrogen sulfide with air or nitrogen, which in turn makes the step complicated. When compounds such as sodium sulfide, sodium hydrosulfide and the like are used, this method cannot be applied to a use where a sodium content matters, since sodium remains in a large amount in phosphoric acid.

In the case of the sulfide coagulation method, when the phosphoric acid concentration is high, particularly in the case of polyphosphoric acid, phosphoric acid itself comes to have a higher viscosity, thereby making the separation for removal of arsenic sulfide more difficult. Therefore, this method is applicable to phosphoric acid having a $P_2O_5$ concentration of about 60% at most.

The method for removing arsenic from phosphoric acid having a higher concentration is disclosed in Japanese Examined Publication No. 53-128595 as the purification method of phosphoric acid by a wet method. According to this method, sodium chloride is added to phosphoric acid having a $P_2O_5$ concentration of up to about 82% to allow reaction of arsenic in phosphoric acid with chlorine for separation and removal. Because this method involves the use of sodium chloride in 1000–2000 ppm, sodium remains in a great amount in phosphoric acid after removing arsenic.

The conventional methods for removing arsenic require a filtration step and a deaeration step, both of which are costly, and sodium remains in a great amount in phosphoric acid.

They cannot be applied to high concentration phosphoric acid having a $P_2O_5$ concentration of not less than 60%, particularly polyphosphoric acid. In addition, there has not been obtained high concentration phosphoric acid, particularly polyphosphoric acid, having lower contents of arsenic, heavy metal, silica and sodium, by a method operable at a low cost. Therefore, the field of use of polyphosphoric acid has been limited to the field free of a high purity requirement.

The present invention provides a completely new method for removing arsenic from phosphoric acid, which is operable at a low cost, which requires no filtration step or deaeration step but is free of a large amount of residual sodium, unlike sulfide coagulation method, and which is applicable to high concentration phosphoric acid, particularly polyphosphoric acid. In addition, the present invention aims at obtaining high purity polyphosphoric acid having low contents of arsenic, heavy metal, silica and sodium, which has not been conventionally obtained.

DISCLOSURE OF THE INVENTION

The present inventors have conducted intensive studies in an attempt to solve the above-mentioned problems and found that the arsenic content of phosphoric acid drastically falls during an organic synthetic reaction accompanying production of hydrogen chloride in high concentration phosphoric acid. Further investigation thereof has revealed that this organic synthetic reaction itself has nothing to do with an arsenic removal effect but, by bringing phosphoric acid into contact with hydrogen halide, the arsenic content of phosphoric acid can be reduced to not more than about 1 ppm, that, when the contact is performed in the presence of a compound capable of generating hydrogen halide under acidic conditions, the arsenic removal effect is enhanced, and that this method is useful for removing arsenic particularly from polyphosphoric acid, which resulted in the completion of the present invention.

Accordingly, the present invention provides the following.
(1) A method for purifying phosphoric acid, which comprises bringing phosphoric acid containing arsenic into contact with hydrogen halide, thereby to remove the arsenic from the phosphoric acid.
(2) The purification method of (1) above, wherein the phosphoric acid containing the arsenic is brought into contact with hydrogen halide in the presence of a compound capable of generating hydrogen halide under acidic conditions.
(3) The purification method of (2) above, wherein the compound capable of generating hydrogen halide under acidic conditions is added in a proportion of less than 1 wt % of a weight of the phosphoric acid.
(4) The purification method of (2) above, wherein the compound capable of generating hydrogen halide under acidic conditions is a chloride of iron(II), copper(I) or tin(II).
(5) The purification method of (1) above, wherein the hydrogen halide is hydrogen chloride.
(6) The purification method of (1) above, wherein the phosphoric acid has a $P_2O_5$ concentration of not less than 72.4%.
(7) A high purity polyphosphoric acid having an iron (Fe) content of not more than 20 ppm, a sodium (Na) content of not more than 100 ppm, a silica ($SiO_2$) content of not more than 50 ppm and an arsenic (As) content of not more than 1 ppm.
(8) The high purity polyphosphoric acid of (7) above, wherein the iron (Fe) content is not more than 10 ppm, the sodium (Na) content is not more than 5 ppm, the silica ($SiO_2$) content is not more than 5 ppm and the arsenic (As) content is not more than 1 ppm.
(9) The high purity polyphosphoric acid of (7) above, which has a chromium (Cr) content of not more than 5 ppm, a nickel (Ni) content of not more than 5 ppm and a molybdenum (Mo) content of not more than 5 ppm.
(10) The high purity polyphosphoric acid of (8) above, wherein the chromium (Cr) content is not more than 2 ppm, the nickel (Ni) content is not more than 2 ppm and the molybdenum (Mo) content is not more than 2 ppm.

Before explaining the present invention in detail, the indication of the phosphoric acid concentration is explained in the following.

In the present invention, phosphoric acid is a polycondensation product of orthophosphoric acid, and its concentration is generally expressed after orthophosphoric acid conversion or $P_2O_5$ conversion. Phosphoric acid having an orthophosphoric acid concentration of 100% corresponds to phosphoric acid having a $P_2O_5$ concentration of 72.4%, wherein the relationship between both concentrations is expressed by the following equation:

$$P_2O_5 \text{ concentration } (\%) = \text{orthophosphoric acid concentration } (\%) \times 0.724$$

Phosphoric acid having a $P_2O_5$ concentration of less than 72.4% is an aqueous phosphoric acid solution containing a polycondensation product of orthophosphoric acid and water in an equilibrium state. Phosphoric acid having a $P_2O_5$ concentration of not less than 72.4% consists solely of a polycondensation product of orthophosphoric acid and is called polyphosphoric acid, strong phosphoric acid or super phosphoric acid. In the present invention, any phosphoric acid concentration is expressed in $P_2O_5$ concentration.

In a first embodiment of the method for purifying phosphoric acid according to the present invention, phosphoric acid containing arsenic is brought into contact with hydrogen halide alone and the arsenic is removed from the phosphoric acid. The reason why an arsenic removal effect is expressed by this method is uncertain, but it is postulated that hydrogen halide causes arsenic in phosphoric acid to convert to an arsenic compound having a high volatility, such as arsenic halide and arsenic hydride, and the compound evaporates at a treatment temperature of the purification method of the present invention and is discharged from the system along with hydrogen halide. It is also unknown as to the chemical state of arsenic in phosphoric acid, but the arsenic is considered to be in the state of arsenic acid, arsenious acid, diarsenic pentaoxide, diarsenic trioxide and the like.

While the phosphoric acid concentration applicable to the first embodiment is free of any particular limitation, when the method is applied to low concentration phosphoric acid, hydrogen halide is dissolved in water to enhance corrosion of phosphoric acid and to cause hydrogen halide to remain after treatment. Thus, this method is advantageously applied to phosphoric acid having relatively lower water content (high phosphoric acid concentration). Particularly, when it is applied to polyphosphoric acid, which is completely anhydrous, hydrogen halide does not remain in polyphosphoric acid, thus enabling elimination of corrosion. When the phosphoric acid to be used is polyphosphoric acid, a concentration range free of freezing point, namely, a $P_2O_5$ concentration of 75–77% or not less than 80% is preferable. In consideration of handling property, the upper limit of $P_2O_5$ concentration is preferably 90%.

In a second embodiment of the method for purifying phosphoric acid of the present invention, phosphoric acid containing arsenic is brought into contact with hydrogen halide in the presence of a compound capable of generating hydrogen halide under acidic conditions, and the arsenic is removed from the phosphoric acid. In this embodiment, arsenic can be removed highly efficiently. The compound capable of generating hydrogen halide under acidic conditions may be an organic or inorganic compound. Particularly, it is preferably metal halide having a reducing action, more preferably halide of iron(II), copper(I) or tin(II), most preferably chloride of these metals, particularly preferably chloride of iron(II) or tin(II).

When phosphoric acid containing arsenic is brought into contact with hydrogen halide in the presence of a compound capable of generating hydrogen halide under acidic conditions, the arsenic removal effect is promoted for unknown reasons, but it is postulated that arsenic itself becomes easily reducible and easily becomes a volatile arsenic compound, such as arsenic halide and arsenic hydride, which is easily evaporated at the treatment temperature of the purification method of the present invention, because the effect is particularly striking when metal halide acting as a reducing agent is added.

The compound capable of generating hydrogen halide under acidic conditions in the second embodiment is added in a trace amount, which is preferably less than 1 wt %, more preferably less than 0.5 wt %, of a weight of phosphoric acid. When it is used in a greater amount, an arsenic removal effect is assumed to be enhanced more. Particularly when this compound is metal halide, however, an impurity derived from a metal in the metal halide unpreferably remains. When the residual impurity is to be avoided, or when high purity phosphoric acid, particularly high purity polyphosphoric acid is desired, the first embodiment wherein phosphoric acid containing arsenic is brought into contact with hydrogen halide alone is preferable rather than the second embodiment.

In the first and the second embodiments, phosphoric acid is brought into contact with hydrogen halide in any typical gas-liquid mixing apparatus, which may be of a batch type or a continuous type. For example, a method wherein a batch reaction vessel is used and phosphoric acid is vigorously stirred with direct blowing of hydrogen halide therein, a method wherein a static mixer or ejector is used and phosphoric acid and hydrogen halide are continuously mixed, a method wherein the both methods are combined, and the like can be employed. The hydrogen halide to be used in the present invention may be hydrogen chloride, hydrogen bromide and the like, with preference given to hydrogen chloride because it is obtained most easily and economically.

In the first and the second embodiments, the necessary amount of hydrogen halide relative to phosphoric acid depends greatly on the gas-liquid mixing efficiency of the apparatus used, and the range of the amount is difficult to specify. Because arsenic in phosphoric acid is considered to be trivalent or pentavalent, at least not less than 3 to 5 molar equivalents of hydrogen halide relative to the arsenic content is considered to be necessary. In the case of the easiest method wherein a batch reaction vessel is used and phosphoric acid is vigorously stirred with direct blowing of hydrogen halide therein, for example, hydrogen chloride is blown into 500 ml of polyphosphoric acid ($P_2O_5$ concentration 85%) having an arsenic content of 50 ppm preferably at a rate of 1–100 ml/min, more preferably 10–80 ml/min, for preferably not less than 30 min, more preferably not less than 60 min.

In the first and the second embodiments, the treatment temperature varies depending on the phosphoric acid concentration and the material of the reactor, but may be any within the range of from about 50° C. to 200° C. In consideration of the corrosion of a stainless material industrially used for a reactor and the like by phosphoric acid, it is desirably not more than 150° C. For promotion of evaporation of the generated arsenic compound, it is desirably at least 50° C., more preferably not less than 100° C. The pressure is free of any particular limitation and can be set optionally, wherein a sufficient dearsenic effect can be achieved under an atmospheric pressure.

In the first and the second embodiments, moreover, the arsenic compound is discharged from the system together with hydrogen halide. These compounds may be preferably absorbed by water and neutralized, or absorbed by an aqueous alkaline solution of sodium hydroxide, potassium hydroxide and the like.

According to the method for purifying phosphoric acid of the present invention, phosphoric acid having a low arsenic content of not more than about 1 ppm can be obtained by an easy method. Particularly, when the method is applied in the presence of a compound capable of generating hydrogen halide under acidic conditions, phosphoric acid having a low arsenic content of not more than about 0.1 ppm can be obtained. In as much as the method does not require an equipment cost for a filtration step or a deaeration step or the use of a sodium compound, such as sodium sulfide, sodium hydrosulfide and the like, unlike the conventional method, it does not happen that sodium remains in a large amount in phosphoric acid. By the application of the purification method of the present invention to phosphoric acid having low contents of heavy metal, sodium and silica, which is obtained by the dry method, phosphoric acid having a low arsenic content and low contents of heavy metal, silica and sodium can be obtained.

The method for purifying phosphoric acid of the present invention does not require conventional filtration steps. Therefore, the method is applicable to high concentration phosphoric acid, particularly polyphosphoric acid. By the application of the purification method of the present invention to polyphosphoric acid having low contents of heavy metal, silica and sodium but a high arsenic content, which is obtained by the dry method, high purity polyphosphoric acid having a low arsenic content and low contents of heavy metal, silica and sodium, which has not been obtained heretofore, can be afforded.

To be specific, by the application of the purification method of the present invention to polyphosphoric acid prepared by adding phosphoric anhydride to industrial phosphoric acid and dissolving therein, polyphosphoric acid having an iron (Fe) content of not more than 20 ppm, a sodium (Na) content of not more than 100 ppm, a silica ($SiO_2$) content of not more than 50 ppm, and an arsenic (As) content of not more than 1 ppm, and further, a chromium (Cr) content of not more than 5 ppm, a nickel (Ni) content of not more than 5 ppm, and a molybdenum (Mo) content of not more than 5 ppm can be obtained.

By the application of the purification method of the present invention to polyphosphoric acid prepared by adding phosphoric anhydride to phosphoric acid as a reagent or phosphoric acid as a food additive and dissolving therein, polyphosphoric acid having an iron (Fe) content of not more than 10 ppm, a sodium (Na) content of not more than 5 ppm, a silica ($SiO_2$) content of not more than 5 ppm, and an arsenic (As) content of not more than 1 ppm, and further, a chromium (Cr) content of not more than 2 ppm, a nickel (Ni) content of not more than 2 ppm, and a molybdenum (Mo) content of not more than 2 ppm can be obtained.

The content of each element of the polyphosphoric acid in the present invention was measured by the following methods.

Arsenic was measured according to JIS-K 0102 (1993). In as much as an organic substance is considered to be absent from a polyphosphoric acid sample, an organic substance decomposition step with sulfuric acid/nitric acid as described in the JIS was omitted. Iron, chromium, nickel, molybdenum and silica were quantitatively determined by an inductively coupled plasma (ICP) analysis. The ICP sample solution was prepared by adding hydrochloric acid to polyphosphoric acid to give 1.2 M hydrochloric acid solution. A calibration curve of the phosphoric acid solution was adjusted to achieve the same concentration as the sample solution. Sodium was quantitatively determined by atomic absorption spectrometry. The atomic absorption sample solution was the same as it was for ICP. The $P_2O_5$ concentration of polyphosphoric acid was determined by titration using 1 M sodium hydroxide solution.

The present invention is explained in more detail in the following by referring to Examples. The present invention is not limited by these examples.

EXAMPLE 1

Commercially available polyphosphoric acid obtained by a dry method (500 ml, $P_2O_5$ concentration 84.9%) having an arsenic content of 58 ppm was stirred with heating at 130° C., during which a glass tube having a glass bowl filter was inserted and hydrogen chloride gas was blown in at an aeration rate of 20 ml/min for about 2 hours to give high purity polyphosphoric acid. The discharged hydrogen chloride gas was trapped in an aqueous sodium hydroxide solution. The analysis results of the obtained high purity polyphosphoric acid are shown in Table 1.

EXAMPLE 2

Commercially available polyphosphoric acid obtained by a dry method (500 ml, $P_2O_5$ concentration 84.2%) having an arsenic content of 8 ppm was cast in a 1(one) liter three-necked glass flask and stirred with heating at 150° C., during which a glass tube having a glass bowl filter was inserted and hydrogen chloride gas was blown in at an aeration rate of 50 ml/min for about 2 hours to give high purity polyphosphoric acid. The discharged hydrogen chloride gas was trapped in an aqueous sodium hydroxide solution. The analysis results of the obtained high purity polyphosphoric acid are shown in Table 1.

EXAMPLE 3

Phosphoric anhydride (200 g) having an arsenic content of 25 ppm was added to phosphoric acid as a reagent (422 g, $P_2O_5$ concentration 61.5%) having an arsenic content of 0.1 ppm. The mixture was stirred with heating at 120° C. to give a homogeneous liquid, whereby polyphosphoric acid ($P_2O_5$ concentration 84.0%) having an arsenic content of 8 ppm was prepared. While stirring under heating at 150° C., a glass tube with a glass bowl filter was inserted and hydrogen chloride gas was blown in at an aeration rate of 20 ml/min for about 3 hours to give high purity polyphosphoric acid. The discharged hydrogen chloride gas was trapped in an aqueous sodium hydroxide solution. The analysis results of the obtained high purity polyphosphoric acid are shown in Table 1.

EXAMPLE 4

Phosphoric anhydride (170 g) having an arsenic content of 25 ppm was added to commercially available polyphosphoric acid obtained by a dry method (330 g, $P_2O_5$ concentration 76.0%) having an arsenic content of 5 ppm. The mixture was stirred under heating at 120° C. to give a homogeneous liquid, whereby polyphosphoric acid ($P_2O_5$ concentration 84.2%) having an arsenic content of 11 ppm was prepared. While stirring under heating at 150° C., a glass tube with a glass bowl filter was inserted and hydrogen chloride gas was blown in at an aeration rate of 20 ml/min for about 3 hours to give high purity polyphosphoric acid. The discharged hydrogen chloride gas was trapped in an aqueous sodium hydroxide solution. The analysis results of the obtained high purity polyphosphoric acid are shown in Table 1.

EXAMPLE 5

Industrial phosphoric acid (500 ml, $P_2O_5$ concentration 65%) having an arsenic content of 15 ppm was cast in a 1(one) liter three-necked glass flask and stirred with heating at 130° C., during which a glass tube having a glass bowl filter was inserted and hydrogen chloride gas was blown in at an aeration rate of 50 ml/min. The discharged hydrogen chloride gas was trapped in an aqueous sodium hydroxide solution. As a result, the concentration of arsenic in phosphoric acid at 180 minutes after the start of blowing was 0.8 ppm.

EXAMPLE 6

The same treatment as in Example 5 was applied except that iron chloride(II) (0.1 g) was added before blowing in hydrogen chloride. As a result, the concentration of arsenic in phosphoric acid at 120 minutes after the start of blowing was 0.07 ppm.

EXAMPLE 7

The same treatment as in Example 5 was applied except that tin chloride(II) dihydrate (0.5 g) was added before blowing in hydrogen chloride. As a result, the concentration of arsenic in phosphoric acid at 120 minutes after the start of blowing was 0.08 ppm.

The analysis results of each element contained in the high purity polyphosphoric acids obtained in Examples 1–4 are shown in Table 1. For comparison, the analysis results of commercially available product A, which is polyphosphoric acid obtained by a dry method, and commercially available product B, which is polyphosphoric acid obtained by a wet method, are also shown in Table 1.

TABLE 1

| Analysis item | Example 1 | Example 2 | Example 3 | Example 4 | Commercially available product A | Commercially available product B |
|---|---|---|---|---|---|---|
| $P_2O_5$ concentration (%) | 84.9 | 84.2 | 84.0 | 84.2 | 85.0 | 84.3 |
| Fe content | 1.6 | 1.0 | 0.2 | 1.2 | 1.6 | 37 |
| Cr content | 0.8 | 0.1 | 0.1 | 0.7 | 0.8 | 6.3 |
| Ni content | 0.6 | 0.3 | 0.1 | 0.4 | 0.6 | 4.4 |
| Mo content | <0.5 | <0.5 | <0.5 | <0.5 | <0.5 | 12 |
| Na content | 0.1 | 0.1 | 0.1 | 0.1 | 0.2 | 250 |

TABLE 1-continued

| Analysis item | Example 1 | Example 2 | Example 3 | Example 4 | Commercially available product A | Commercially available product B |
|---|---|---|---|---|---|---|
| $SiO_2$ content | <5 | <5 | <5 | <5 | <5 | 120 |
| As content | 0.5 | 0.08 | 0.03 | 0.03 | 58 | 0.02 |

In Table 1, respective contents are in the unit of ppm.

As is evident from Table 1, the commercially available product A (polyphosphoric acid obtained by a dry method) showed low contents of heavy metal, silica and sodium but a high arsenic content, and the commercially available product B (polyphosphoric acid obtained by a wet method) showed a low arsenic content but high contents of heavy metal, sodium and silica. In contrast, the high purity polyphosphoric acids of Examples 1–4 showed low arsenic contents, and low contents of heavy metal, sodium and silica. From Examples 6 and 7, it is evident that, when phosphoric acid containing arsenic is brought into contact with hydrogen halide in the presence of a compound capable of generating hydrogen halide under acidic conditions, such as iron chloride(II), tin chloride(II) and the like, an effect of removing arsenic in phosphoric acid can be enhanced.

As is evident from the following explanation, the method for purifying phosphoric acid of the present invention can effectively remove arsenic in phosphoric acid, which is harmful for human being, by a simple manipulation wherein phosphoric acid is brought into contact with hydrogen halide. To be specific, the arsenic content of several dozen ppm of general industrial phosphoric acid can be reduced to not more than about 1 ppm. When the above-mentioned step is applied in the presence of a compound capable of generating hydrogen halide under acidic conditions, the removal to the level of not more than about 0.1 ppm is possible.

This method includes a simple treatment step and requires no special apparatus. As a result, the total cost for the treatment is low, and since a sodium compound is not used, unlike the conventional method, sodium does not remain in a large amount in phosphoric acid.

Moreover, since the method for purifying phosphoric acid of the present invention does not require a filtration step, unlike a conventional purification method, it can be applied to high concentration phosphoric acid, particularly polyphosphoric acid. Particularly, when polyphosphoric acid obtained by a dry method and having low contents of heavy metal, sodium and silica but a high arsenic content is subjected to the purification method of the present invention, high purity polyphosphoric acid having a low arsenic content and low contents of heavy metal, silica and sodium can be afforded, which has not been obtained heretofore. Such high purity polyphosphoric acid is highly safe and can reduce the environmental burden. Therefore, it is applicable to a broader range of use in the fields of food, medicaments and electronic materials.

This application is based on patent application Nos. 373696/1998 and 230628/1999 filed in Japan, the contents of which are hereby incorporated by reference.

What is claimed is:

1. A method for purifying phosphoric acid, which comprises bringing phosphoric acid containing arsenic into contact with hydrogen halide in the presence of a compound capable of generating hydrogen halide under acidic conditions, wherein the compound capable of generating hydrogen halide under acidic conditions is a halide of iron (II), copper (I) or tin (II), thereby to remove the arsenic from the phosphoric acid.

2. The purification method of claim 1, wherein the compound capable of generating hydrogen halide under acidic conditions is added in a proportion of less than 1 wt % of a weight of the phosphoric acid.

3. The purification method of claim 1, wherein the compound capable of generating hydrogen halide under acidic conditions is a chloride of iron(II), copper(I) or tin(II).

4. The purification method of claim 1, wherein the hydrogen halide is hydrogen chloride.

5. The purification method of claim 1, wherein the phosphoric acid has a $P_2O_5$ concentration of not less than 72.4%.

* * * * *